(No Model.)

D. KENNEDY, Jr.
PIPE COUPLING.

No. 410,552.   Patented Sept. 3, 1889.

Witnesses:
Chas. J. Buchheit
Theo. L. Popp

D. Kennedy Jr., Inventor.
By Wilhelm Bonnet
Attorneys.

UNITED STATES PATENT OFFICE.

DAVID KENNEDY, JR., OF ERIE, PENNSYLVANIA, ASSIGNOR OF ONE-HALF TO ERASTUS B. LIPTON, OF SAME PLACE.

PIPE-COUPLING.

SPECIFICATION forming part of Letters Patent No. 410,552, dated September 3, 1889.

Application filed October 8, 1888. Serial No. 287,531. (No model.)

*To all whom it may concern:*

Be it known that I, DAVID KENNEDY, Jr., of Erie, in the county of Erie and State of Pennsylvania, have invented new and useful Improvements in Pipe-Couplings, of which the following is a specification.

This invention relates to the couplings which are employed for connecting together the air and steam or heating pipes of railway-cars.

The object of my invention is to construct a coupling of this class which shall be perfectly tight and rigid when the parts thereof are coupled, so as not to allow of leakage in passing around curves, or when otherwise subjected to unusual strains, and also to construct the coupling in such a manner that in case the pipes connected with the coupling become loose they can be readily tightened without impairing the efficiency of the coupling or disarranging the parts thereof.

The invention consists to these ends of the improvements which will be hereinafter fully set forth, and pointed out in the claims.

Figure 1:
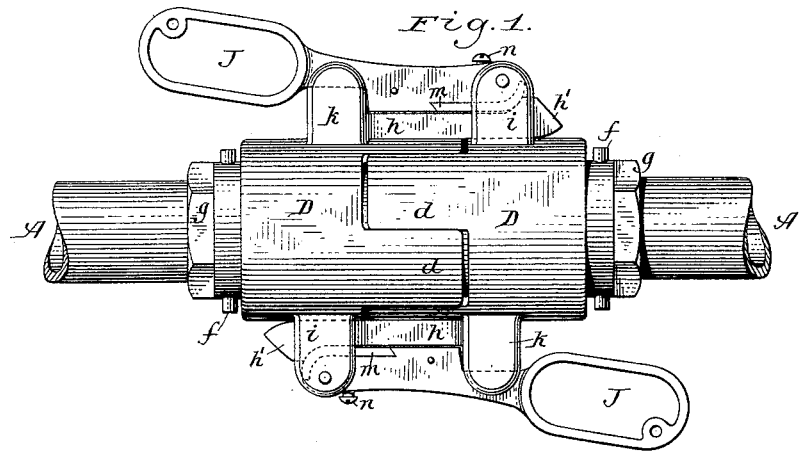
Figure 2:
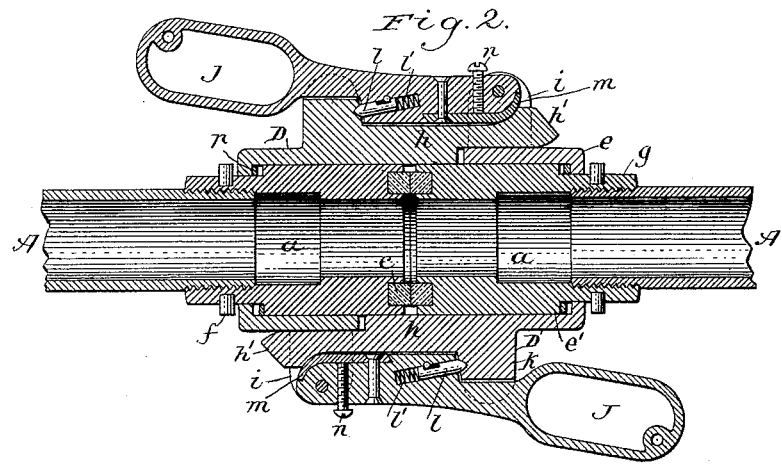
Figure 3:
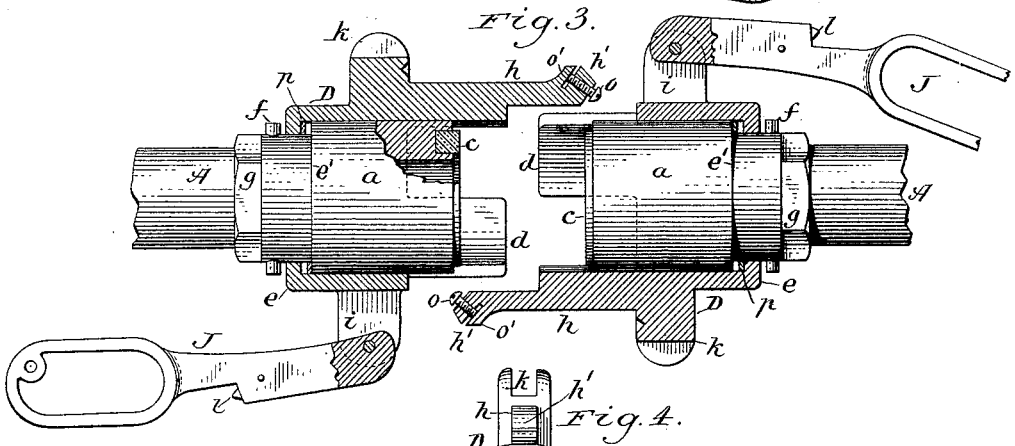
Figure 4:
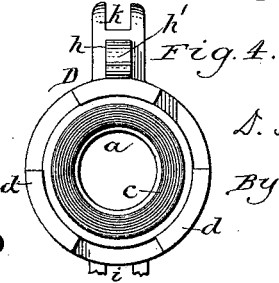

In the accompanying drawings, Figure 1 is a side elevation of the coupling. Fig. 2 is a longitudinal section thereof. Fig. 3 is a sectional elevation of the coupling, showing the parts uncoupled. Fig. 4 is an end view of one of the parts of the coupling.

Like letters of reference refer to like parts in the several figures.

A A represent the air or heating pipes of two opposing cars, each of which is provided with a part of the coupling, the two parts being exact duplicates of each other. Each pipe A is provided at its end with a collar or head $a$, which is secured to the pipe by a screw-thread, as shown, the pipe being preferably formed with an external screw-thread, which engages with an internal thread at the inner end of the head $a$. A packing-ring $c$ of rubber or other material is secured to the outer end of each head $a$, being seated in an annular groove formed in the head, as shown in Figs. 2 and 3.

D represents a coupling-sleeve inclosing the collar or head $a$ of each pipe. The outer end of each coupling-sleeve is formed of a series of segments $d$, with open spaces between each segment, so that the segments on one of the sleeves will fit in the spaces between the segments of the opposing sleeve and interlock the two sleeves of the coupling with each other. The coupling-sleeves, when interlocked, are held from turning independently of each other or in opposite directions, and form a continuous sleeve inclosing the heads of the two pipes, with its joint projecting on opposite sides of the meeting ends of the two heads. The heads or collars $a$ fit snugly in the bore of the sleeves, and the latter, when interlocked with each other, hold the heads or collars of the two pipes in perfect alignment with the packing-rings of the two heads in contact with each other, and prevent any lateral or twisting movement of the heads with reference to each other.

Each sleeve D is provided at its inner end with an inwardly-projecting annular flange $e$, which surrounds the contracted inner portion of the head $a$, and limits the outward movement of the sleeve on the head by striking an annular shoulder $e'$, formed at the junction of the enlarged and reduced portions of the head, as represented in Figs. 2 and 3. The heads $a$ are each provided with pins $f$, which limit the inward movement of the coupling-sleeves D on the heads. The sleeves D have a limited longitudinal movement between the shoulders $e'$ and pins $f$ on the heads $a$, and are capable of turning on said heads. Each head is formed with a polygonal or flat-sided inner end, as shown at $g$, so that it can be turned by a wrench.

Each coupling-sleeve D is provided with a connecting arm or shank $h$, which projects beyond the outer edge of the coupling-sleeve and fits between two parallel jaws or lugs $i$, formed on the outer side of the opposing coupling-sleeve when the parts of the coupling are connected together. The shanks $h$ are provided at their outer ends with a head or enlargement $h'$. Each coupling-sleeve is provided with a connecting-shank $h$ and a pair of lugs $i$, arranged on diametrically-opposite sides of the sleeve in line with the corresponding parts of the opposing sleeve, as shown in the drawings.

J J represent locking or cam levers pivoted between the upper ends of the lugs $i$, and which bear with their inner faces against the heads or enlargements of the connecting-shanks $h$, thereby preventing the withdrawal of the shanks from between the lugs $i$ and firmly securing together the parts of the coupling. When in a locked position, each cam-lever J is seated in a recessed lug or ear $k$, formed on the coupling-sleeve D of the opposing pipe and arranged in line with the cam-lever, as shown in Figs. 1 and 2. The cam-levers are preferably held in the recesses of the lugs $k$ by spring-catches, which consist of a sliding bolt $l$, arranged in a socket in the cam-lever and projecting into a notch in the lug $k$, and a spring $l'$, whereby the sliding bolt is protruded. The outer ends of the spring-catches are beveled on both sides, so that the catches can be engaged with and disengaged from the notches of the lugs by a slight pressure or pull of the cam-lever.

The cam-levers are each provided with an adjustable wearing face or strip $m$, so that the wear of the levers may be taken up. The wear-strip $m$ is attached at one end to the lever by a rivet or other means, and its free end is moved outwardly by an adjusting-screw $n$, arranged in a threaded opening in the lever and bearing against the wear-strip $m$, as represented in Fig. 2.

The heads of the connecting-shanks $h$ may also be made adjustable for wear by slitting the heads and arranging in the same an adjusting-screw $o$, which bears against the lip $o'$ so formed on the head, as shown in Fig. 3 of the drawings.

As the two cars come together, the segments $d$ of one coupling-sleeve D enter the spaces between the segments of the opposing coupling-sleeve, and the connecting-shanks $h$ enter between the jaws $i$, the cam-levers J being thrown backwardly into the position shown in Fig. 3 to permit the shanks to enter between said jaws. The locking-levers are then swung forwardly and inwardly into the position represented in Figs. 1 and 2, whereby the coupling-sleeves are drawn tightly toward each other by the levers J bearing against the heads $h'$ of the shanks, and a perfectly tight joint is formed between the packings $c$ of the coupling. The sleeves D, with their interlocking segments $d$ and connecting-shanks $h$, form a rigid connection between the parts of the coupling, which prevents any lateral or twisting movement of the parts upon each other, and thus forms a perfectly tight and reliable joint.

In case the pipes A become loose they are readily tightened by turning the threaded heads or collars $a$ within the coupling-sleeves D, so as to draw the ends of the pipes farther into said collars, the latter being capable of sufficient lengthwise movement in the sleeves D to tighten the pipes in this manner. This construction permits the heads $a$ and coupling-sleeve D to be turned independently of each other, so that the coupling-sleeves can always be kept in proper register with each other.

A spring $p$ is preferably interposed between the inner end of each head $a$ and the flange $e$, which springs tend to move the heads outwardly as their packings $c$ become worn.

I claim as my invention—

1. In a pipe-coupling, the combination, with the heads or collars $a$, each provided at its outer end with a suitable packing, of movable coupling-sleeves surrounding said heads and each provided at its outer end with a series of projecting segments, the segments on one of said sleeves interlocking with the segments on the opposing sleeve, whereby the two sleeves are held from turning in opposite directions, and which form together a continuous sleeve inclosing both heads, with its joint overlapping the meeting ends of the two heads, said sleeves being free to turn on said heads when coupled and having a limited lengthwise movement thereon, and a locking-lever pivoted to one of said sleeves and engaging with the opposing sleeve, whereby the two sleeves are drawn together, substantially as set forth.

2. In a pipe-coupling, the combination, with the heads or collars $a$, each provided at its outer end with a suitable packing, of coupling-sleeves surrounding said heads and provided with interlocking segments which together form a continuous sleeve inclosing both heads, a connecting-shank formed on each sleeve and engaging between lugs formed on the opposing sleeve, and locking-levers pivoted to each sleeve and engaging with the shank of the opposing sleeve, whereby the two sleeves are drawn together, substantially as set forth.

3. The combination, with two adjacent pipes provided at their ends with heads or collars $a$, of the coupling-sleeves D, surrounding said heads, a shank or connecting-bar $h$, arranged on one of said sleeves and engaging between two jaws on the opposing sleeve, and a locking-lever J, attached to said last-mentioned coupling-sleeve and bearing against the connecting-shank $h$, substantially as set forth.

4. The combination, with two adjacent pipes provided at their ends with heads or collars $a$, of the coupling-sleeves D, surrounding said heads and each provided on diametrically-opposite sides with a connecting-shank $h$, and a pair of jaws or lugs $i$, and with a cam-lever J, pivoted between said jaws, substantially as set forth.

5. The combination, with two adjacent pipes, each provided at its end with a head or collar $a$, of coupling-sleeves D D, respectively surrounding the heads and provided with interlocking segments $d$, a pair of jaws $i$, arranged on one side of each coupling-sleeve, a cam-lever J, pivoted between said jaws, a connecting-shank $h$, and recessed lug $k$, arranged on the opposite side of the coupling-sleeve, and a spring-catch, whereby the cam-lever J of one coupling-sleeve is attached to the lug $k$ of the opposite coupling-sleeve, substantially as set forth.

6. In a pipe-coupling, the combination, with the heads $a$, and coupling-sleeves D, surrounding said heads, of a connecting-shank $h$, secured to each sleeve and engaging between a pair of jaws $i$, formed on the opposing sleeve, and a cam-lever J, pivoted to each sleeve between said jaws and provided with an adjustable wear-plate which bears against the shank of the opposing sleeve when the sleeves are secured together, substantially as set forth.

Witness my hand this 20th day of September, 1888.

DAVID KENNEDY, Jr.

Witnesses:
E. B. LIPTON,
EMIL W. JARECKI.